(12) United States Patent
Sonnenburg

(10) Patent No.: US 10,101,751 B2
(45) Date of Patent: Oct. 16, 2018

(54) SYSTEM AND METHOD OF AIR POLLUTION CONTROL FOR LIQUID VACUUM TRUCKS

(71) Applicant: Ray Sonnenburg, Deer Park, TX (US)

(72) Inventor: Ray Sonnenburg, Deer Park, TX (US)

(73) Assignee: Ray Sonnenburg, Abilene, TX (US)

( * ) Notice: Subject to any disclaimer, the term of this patent is extended or adjusted under 35 U.S.C. 154(b) by 190 days.

(21) Appl. No.: 15/185,261

(22) Filed: Jun. 17, 2016

(65) Prior Publication Data

US 2016/0375815 A1  Dec. 29, 2016

Related U.S. Application Data

(60) Provisional application No. 62/184,992, filed on Jun. 26, 2015.

(51) Int. Cl.
| | | |
|---|---|---|
| *B60P 3/24* | (2006.01) | |
| *G05D 7/06* | (2006.01) | |
| *B60P 3/22* | (2006.01) | |

(52) U.S. Cl.
CPC .......... *G05D 7/0676* (2013.01); *B60P 3/2255* (2013.01); *B60P 3/243* (2013.01)

(58) Field of Classification Search
CPC ........ G05D 7/0676; B60P 3/22; B60P 3/2255; B60P 3/243; B60P 3/246
See application file for complete search history.

(56) References Cited

U.S. PATENT DOCUMENTS

| | | | |
|---|---|---|---|
| 2,664,911 A | | 1/1954 | Thompson |
| 3,159,301 A | * | 12/1964 | Anderson ................. F15B 1/08 220/222 |
| 3,315,611 A | | 4/1967 | Thompson |
| 3,438,215 A | * | 4/1969 | Frijlink .................. F17C 3/022 137/578 |
| 3,621,893 A | | 11/1971 | Nishimura |
| 3,971,400 A | | 7/1976 | Thompson |
| 4,038,940 A | | 8/1977 | Gierse |
| 4,082,124 A | | 4/1978 | Jenkins |
| 4,113,410 A | | 9/1978 | Ando |
| 4,408,960 A | | 10/1983 | Allen |
| 4,925,532 A | | 5/1990 | Meuser et al. |
| 5,030,259 A | | 7/1991 | Bryant et al. |

(Continued)

FOREIGN PATENT DOCUMENTS

| | | |
|---|---|---|
| CN | 102888892 | 1/2013 |
| DE | 3027284 | 2/1981 |

*Primary Examiner* — Nicolas A Arnett
(74) *Attorney, Agent, or Firm* — Conley Rose PC

(57) ABSTRACT

A system. The system includes a container comprising a cylindrical shell, wherein the cylindrical shell defines an internal volume of the container, and a barrier. The barrier includes a disk slideably disposed within the interior volume of the container, the disk subdividing the interior volume of the container into a first portion and a second portion, and a seal disposed about a circumference of the disk and in sealing contact with an interior surface of the cylindrical shell. The first portion is configured to sustain an internal pressure in a predetermined range; and the second portion is configured to receive a waste material. When the internal pressure is at a maximum value of the predetermined range, the disk has a deflection less than a predetermined deflection at which the sealing contact is compromised.

11 Claims, 7 Drawing Sheets

(56) References Cited

U.S. PATENT DOCUMENTS

| | | | |
|---|---|---|---|
| 5,419,400 A | 5/1995 | Wigington, Sr. | |
| 5,492,144 A * | 2/1996 | Kriewaldt | B60P 3/2255 137/205 |
| 5,960,810 A | 10/1999 | Douglas | |
| 7,108,016 B2 * | 9/2006 | Moskalik | B60K 6/12 138/26 |
| 7,661,442 B2 * | 2/2010 | O'Brien, II | B60K 6/12 138/30 |
| 8,695,643 B2 * | 4/2014 | Rajabi | F15B 1/24 138/109 |
| 8,919,391 B1 * | 12/2014 | Harvey | B67D 7/0277 141/231 |
| 2005/0194054 A1 * | 9/2005 | Moskalik | B60K 6/12 138/31 |
| 2008/0308168 A1 * | 12/2008 | O'Brien, II | B60K 6/12 138/31 |
| 2009/0114296 A1 | 5/2009 | Tsuda | |
| 2014/0341754 A1 | 11/2014 | McClister et al. | |
| 2015/0143821 A1 | 5/2015 | Johnson et al. | |
| 2015/0316007 A1 | 11/2015 | Williams et al. | |

* cited by examiner

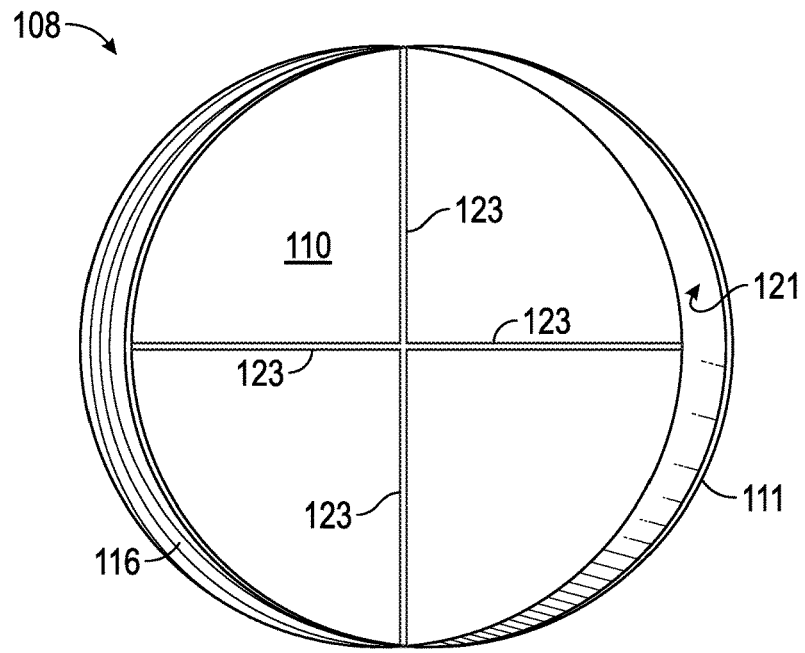
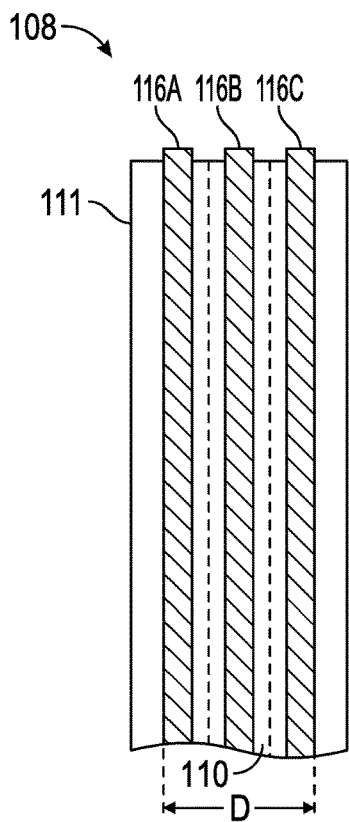 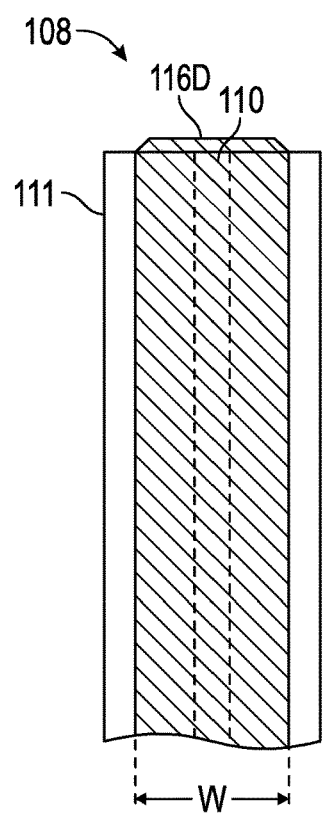
FIG. 1A
FIG. 2A  FIG. 2B

SYSTEM AND METHOD OF AIR POLLUTION CONTROL FOR LIQUID VACUUM TRUCKS

CROSS-REFERENCE TO RELATED APPLICATIONS

This application claims the benefit of U.S. Provisional Application Ser. No. 62/184,992 filed Jun. 26, 2015 and titled "System and Method of Air Pollution Control for Liquid Vacuum Trucks". The provisional application is incorporated by reference herein as if reproduced in full below.

BACKGROUND

Liquid vacuum trucks are used to collect and transport hazardous and non-hazardous liquid and semi-liquid waste. Non-hazardous waste includes sewage and septic materials. Hazardous waste, waste that poses a substantial threat to public health or the environment, includes volatile organic compounds, nitrogen oxide, sulfur dioxide, and other particulate waste matter. Liquid vacuum trucks are also frequently used to assist in cleaning up waste spills and for transporting liquids and semi-solids at industrial facilities.

BRIEF DESCRIPTION OF THE DRAWINGS

For a detailed description of exemplary embodiments of the invention, reference will now be made to the accompanying drawings in which:

FIG. 1A shows a portion of the system of FIG. 1 in further detail in accordance with at least some embodiments;

FIGS. 2A and 2B shows a portion of the system of FIG. 1 in further detail in accordance with at least some embodiments;

NOTATION AND NOMENCLATURE

Figure 1:
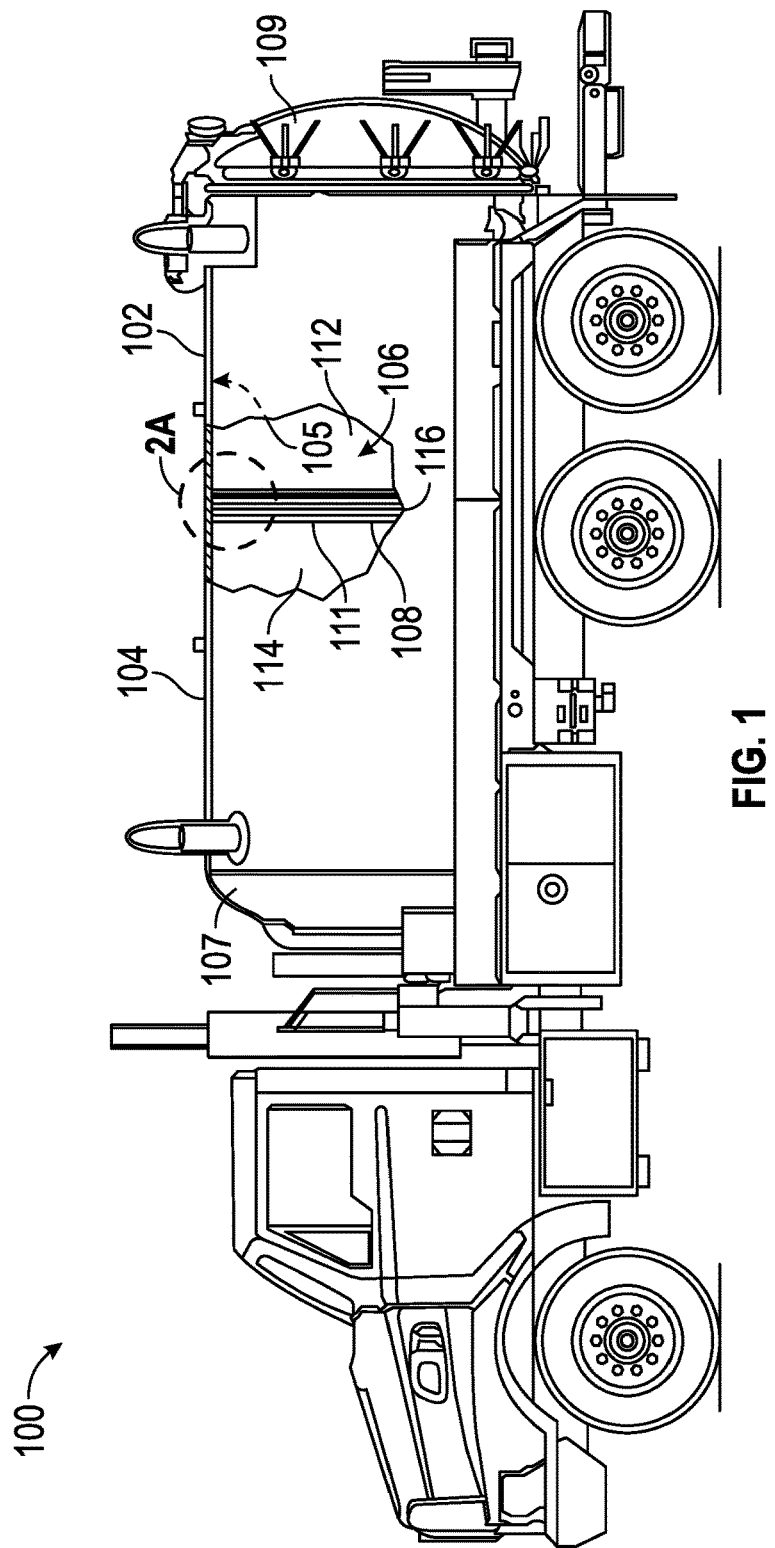
FIG. 1 shows 1 illustrates a partial cutaway view of a system according to an embodiment of the disclosure.

Certain terms are used throughout the following description and claims to refer to particular system components. As one skilled in the art will appreciate, a component may be referred to by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct, connection. Thus, if a first device couples to a second device, that connection may be through a direct connection or through an indirect connection via other devices and connections.

"About" as used herein in conjunction with a numerical value shall mean the recited numerical value as may be determined accounting for generally accepted variation in measurement, manufacture and the like in the relevant industry.

"Exemplary", as used herein, means "serving as an example, instance, or illustration," An embodiment described herein as "exemplary" is not necessarily to be construed as preferred or advantageous over other embodiments.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In related art, a liquid vacuum truck system contains a metal tank with a vacuum pump and nozzle attached to import liquid or semi-liquid waste into the tank for transportation and disposal. The related art liquid vacuum trucks permit vapors produced by the liquid or semi-liquid waste to enter and exhaust into the atmosphere from the vacuum pump. The vapor produced by this waste can be toxic, flammable, and/or negatively impact the environment.

A number of states have exempted the air pollution limits of facilities during special periods of activity, specifically during startup, shutdown, and malfunction operations ("SSM"). During the period of a facility's startup and shutdown procedures, or during a malfunction, high levels of hazardous pollutants can be released causing air pollution in nearby communities. These exemptions have been incorporated into State Implementation Plans ("SIP") that were approved by the United States Environmental Protection Agency ("EPA"). Recently, a number of legal challenges have resulted in the EPA re-evaluating SIPs with respect to SSM operations. On May 22, 2015, the EPA issued a Final Action determining that these emission exemptions during SSM operations are inconsistent with the Clean Air Act of 1970 and must be modified. Compliance with the EPA Final Action is required by Nov. 22, 2016.

These rules for air emissions can be applicable to the operation of liquid vacuum trucks, which often operate and emit impermissible levels of pollutants into the air during SSM. A number of methods may be used to control the emissions from liquid vacuum trucks. These methods include the use of activated carbon container scrubbers, liquid solution container scrubbers, combination carbon and liquid solution scrubbers, and internal combustion engine units. These methods, however, are expensive, time consuming, pose potential fire hazards, require additional space on or around a truck, and may require additional disposal of the spent scrubbing media.

The present disclosure provides systems and apparatus to address the control of air pollution and emissions from liquid vacuum trucks. The systems and apparatus according to the disclosure may be adapted to existing liquid vacuum trucks, without the need for scrubbers and the like.

Turning now to FIG. 1, a liquid vacuum truck system 100 in accordance with an embodiment of the present disclosure is shown. The liquid vacuum truck system 100 includes a vacuum pump, described further below (not shown in FIG. 1), and a waste container 102 which can be comprised of any structurally sound material, including stainless steel and other metals. For example, a stainless steel such as type 316 stainless steel. Other materials which may be used include brass, HASTELLOY®, and Carpenter 20 and similar corrosion-resistant metal alloys. Waste container 102 may comprise a shell 104. The shell 104 and waste container 102 may be one and the same and made of the same material. A cross-section of shell 104 may be cylindrical. Alternatively, waste container 102 may include a shell 104 having end members 107 and 109 integrated therewith. In at least some embodiments, at least one of end members 107 and 109 comprises a hatch. Shell 104 comprises smooth interior surface 105. Alternatively, the shell 104 may be a liner disposed within an outer hull (not separately shown) made of a material that exhibits a smooth interior surface 105. In at least some embodiments, shell 104 defines an interior volume of the container, interior volume 106. Interior volume 106 may have a diameter from about 72 inches to about 78 inches. However, other dimensions may also be used. In embodiments in which shell 104 and waste container 102 are different materials, inasmuch as waste container 102 may then be protected from contact with contents therein, waste container 102 may comprise materials that might otherwise corrode or have other chemical interactions with the contents, for example carbon steel or aluminum.

Continuing with FIG. 1, the internal volume 106 of waste container 102 is divided into two portions by a barrier 108, thereby creating two chambers, a clean side 114 and a dirty side 112. Barrier 108 may be comprised of a disk 110 (shown in FIG. 1A) and a seal fixture 111 which may be made of the same material as shell 104, and one or more seals 116 disposed about an outer circumference of seal fixture 111. Seal fixture 111 can, in alternative embodiments, be comprised of material compatible with the material of shell 104. As described below in conjunction with FIG. 1A, the seal(s) 116 form a gasket between the disk 110 (FIG. 1A) and the interior surface 105 of the shell 104. Seals 116 may comprise an elastomeric material that is chemically resistant to materials that might be collected in waste container 102. Exemplary elastomers which may be used in at least some embodiments include VITON fluoroelastomer, TEFLON polytetrafluoroethylene (PTFE), Buna, neoprene, polyurethane, ethylene propylene diene monomer (EPDM) rubber, XL thermoplastic elastomer (TPE), GEOLAST thermoplastic rubber, HYTREL thermoplastic elastomer, polyvinylidene fluoride (PDVF), and polypropylene. The foregoing are by way of example, and any suitable elastomer may be used that provides a seal between disk 110 (FIG. 1A) and the interior surface 105 of the shell 104 to mitigate against the transport of materials, including volatile compounds, from the dirty side 112 to the clean side 114.

Turning to FIG. 1A, FIG. 1A shows barrier 108 in further detail in a side perspective view. Barrier 108 further comprises a disk 110 disposed within and fixedly engaged with an interior circumference 121 of seal fixture 111, the disk 110 separating the two portions of the interior volume 106 which define the dirty and clean sides 112 and 114, respectively. Disk 110 may be comprised of the same material as seal fixture 111. Disk 110 may have one or more stiffeners 123 attached thereto, as will be more fully described hereinbelow. Thus, seals 116 are disposed about disk 110 via the support of seal fixture 111 to form a gasket with the interior surface 105 (FIG. 1) of shell 104. Seal fixture 111 may be used in at least some embodiments to mitigate against the cocking of disk 110 within the interior volume 106 of shell 104.

The disposition of seals 116 may be further appreciated by referring to FIGS. 2A and 2B, which shows a portion of barrier 108, and two exemplary embodiments of seals 116, FIGS. 2A and 2B, respectively. In one embodiment three seals 116A-C are disposed about the periphery of seal fixture 111. Although three seals are used in this example, other numbers of seals 116 may be used. For example, in another embodiment, a single seal 116D may be disposed about the periphery. Seal 116D may have a width W, that about the same as a distance D across the thickness of disk 110 spanned by the seals 116A-C. However, in alternative embodiments, the width W, may be narrower or wider than D. Further, in at lest some embodiments, seal fixture 111 may be in the range of about 6 inches to 10 inches in width, and have a thickness in the range of from about 0.75 inches to about 1.5 inches. The thickness of disk 110 may be in the range of about 0.25 inches to about 0.375 inches, as described further below.

Liquid vacuum truck system 100 operates in the following manner. A vacuum pump, described further below (not shown in FIG. 1), of liquid vacuum truck system 100 creates a vacuum on the clean side 114 of the internal volume 106 of waste container 102 to move the barrier 108. Stated differently, by drawing a vacuum on the clean side 114, barrier 108 may slide so as to reduce the volume of the clean side 114 and, concomitantly, increase the volume of the dirty side 112. The movement of barrier 108 thus causes a vacuum in dirty side 112 of waste container 102 that permits a liquid or semi-liquid waste material to be aspirated or vacuumed into the dirty side 112 of waste container 102. Barrier 108 prevents leakage of waste material from dirty side 112 to clean side 114, as described further below. As more waste is aspirated into dirty side 112 and as barrier 108 moves across the internal volume 106, the volume of dirty side 112 continues to increase and the volume of clean side 114 continues to decrease. Once the dirty side 112 reaches its maximum volume, or otherwise reaches its maximum waste capacity, the liquid or semi-liquid waste can be transported and disposed of. The movement of barrier 108 can be reversed by operating the vacuum pump in pressure mode to offload the liquid or semi-liquid waste as necessary. Pressurizing the clean side 114 motivates the barrier 108 towards the dirty side 112, decreasing the volume thereof and expelling the waste contained therein. As the barrier 108 is displaced, seals 116 also operate to wipe interior surface 105 of any waste residue that might be deposited thereon, As set forth above, shell 104 included a smooth interior surface 105. Stated differently, a smoothness of interior surface 105 and porosity of shell 104 in conjunction with the disk seals 116, should be such that any volatile compounds in the dirty side 112 are constrained from "bleeding" into clean side 114 through interstices between the seals 116 and interior surface 105, or through pores in the interior surface 105 and/or shell 104. For example, the smoothness and porosity may be such that, to the extent there is any bleed through to the clean side 114 the concentration of volatile compounds therein, particularly volatile organic compounds (VOCs) is less than a predetermined amount, say about 100 parts per million (ppm). In other words, the smoothness of interior surface and porosity of the interior surface 105 and the shell 104 should be such that these structures are impermeable to liquids and vapors, including VOCs, wherein the concentration of VOCs in the clean side 114 does not exceed a predetermined value, for example, 100 ppm. Further, the smoothness and porosity of the interior surface 105 and shell 104 may be such that the clean side 114 does not retain an amount of residue from the dirty side 112 wherein the concentration of VOCs exceeds the predetermined value after the seals have been caused to be moved toward the dirty side 112, and have wiped the interior surface 105.

The dirty side 112 of the interior volume 106 may be at about atmospheric pressure. Because of the pressure differential between the "clean" and "dirty" sides of barrier 108, disk 110 may be subject to stresses tending to deform the disk. If, the deflection of the disk 110 from such stresses exceeds a predetermined value, which may be based on the particular disposition of seals 116, the sealing contact between barrier 108 and the interior surface 105 of the shell 104 may be compromised such as to allow the passage of material, e.g. volatile compounds, between dirty side 112 and clean side 114. These compounds may then be exhausted from clean side 114, potentially to the atmosphere, as described further below. Thus, the structure of disk 110 may be based on the deflection of disk 110 being below the predetermined maximum deflection value when the pressure differential across the clean and dirty sides has a maximum value. Stated otherwise, as the pressure on the clean side 114 varies within a predetermined range, which may include both positive and negative pressure values, the clean side 114 of the internal volume 106 sustains an internal pressure in a predetermined range. As the pressure varies within the predetermined range, the deflection of the disk 110 may also vary, and a maximum predetermined deflection may be based on the aforesaid compromise of the sealing contact.

As previously described, a partial vacuum imposed on clean side 114 produces a displacement of the barrier 108 such that waste is aspirated into the dirty side 112. Thus the partial vacuum may comprise a negative gauge pressure up to about −15 pounds per square inch, gauge (−15 psig). Conversely, a positive pressure imposed on clean side 114, expels the waste from the dirty side 112. In at least some embodiments, a positive pressure of up to about 35 psig may be imposed on clean side 114. The aforesaid pressure values are by way of example, and other pressures, both positive and negative, may be used in various embodiments. The largest deflection of disk 110 may be expected at the largest in magnitude pressure imposed on the clean side 114. Thus, in the foregoing example, the largest deflection of the disk 110 may be expected at the positive 35 psig pressure imposed when expelling the waste In this example, the deflection would be expected to take the form of a convex bowing of the disk 110 toward the dirty side 112. Conversely, with the application of negative pressure a convex bowing of the disk 110 toward the clean side 114 would be expected. In at least some embodiments, a thickness of disk 110 in a preselected range, for example, from about 0.250 inches to 0.375 inches may be used to maintain the deflection below the predetermined value based on the compromise of the sealing contact.

Figure 3A:
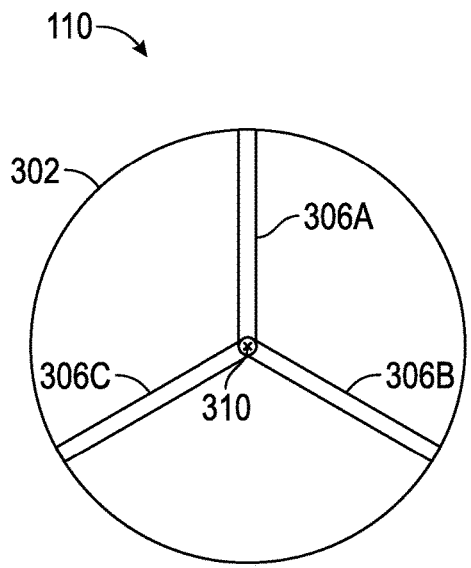
FIGS. 3A and 3B show, in two views, a portion of the system of FIG. 1 in further detail in accordance with at least some embodiments.
Figure 3B:
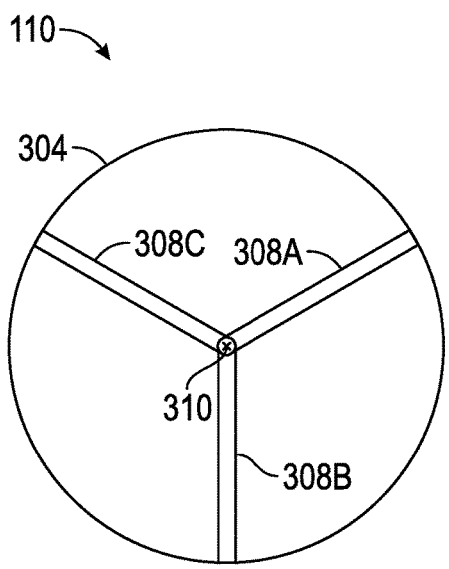
Figure 4A:
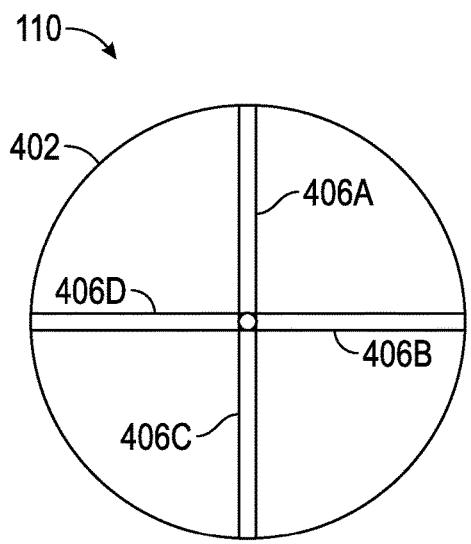
FIGS. 4A and 4B show, in two views, a portion of the system FIG. 1 in further detail in accordance with at least some embodiments.
Figure 4B:
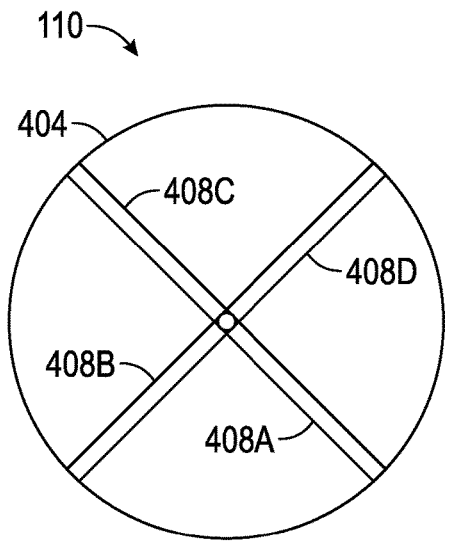

In some alternative embodiments, stiffeners may be attached to one or both sides of the disk 110. This may be further appreciated by turning to FIGS. 3A and 3B, which illustrate, respectively, views of first and second sides 302 and 304 of an exemplary disk 110 having stiffeners 306A-C and 308A-C on the opposite sides of disk 110. Stiffeners 306A-C and 308A-C may extend from the center to the periphery of disk 110. The three stiffeners 306A-C are, in the exemplary embodiment in FIGS. 3A, 3B, circumferentially disposed at 120° intervals about the side 302. Likewise, the three stiffeners 308A-C may be similarly disposed about the circumference of side 304. In at least some embodiments, the stiffeners 306A-C and 308A-C may be offset relative to each other by a preselected angle, 60° in the exemplary embodiment of disk 110 in FIGS. 3A, 3B. Alternatively, other offset angles may be used. Stated differently, stiffeners 306A-C are rotationally offset about an axis 310 central to the disk 110. Stiffeners 306A-C and 308A-C may comprise angle or channel-shaped material and may be composed of the same or different material as disk 110. Stiffeners 306A-C and 308A-C may be attached to disk 110 by any suitable mechanism, such as by welding, riveting, or bolting. While three stiffeners are used in the embodiment in FIGS. 3A, 3B, other numbers of stiffeners may be used. Thus, in the embodiment in FIGS. 4A, 4B, four stiffeners 406A-D and 408A-D are attached to sides 402 and 404 of disk 110, respectively. In this example, stiffeners 406A-D and 408A-D are symmetrically circumferentially disposed at 90° intervals. Further, in this example, the stiffeners 408A-D and 406A-D are offset by 45° relative to each other. The stiffeners 406A-D and 408A-D may be composed of materials similar to stiffeners 306A-C and 308A-C and attached to disk 110 in likewise fashion.

Figure 5:
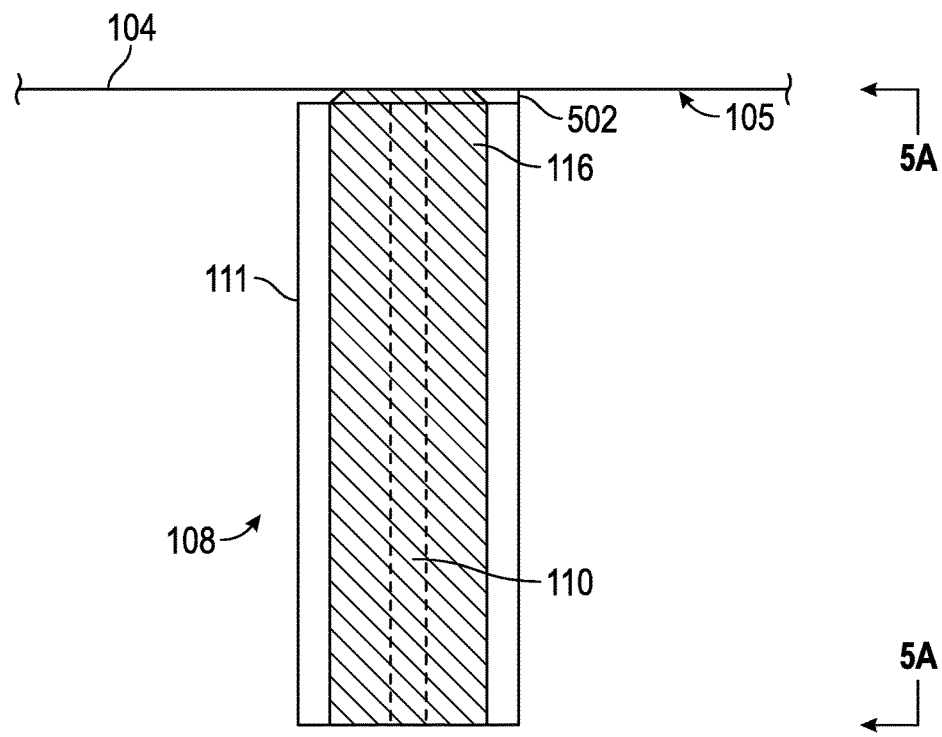
FIGS. 5 and 5A show, in two views, a portion of the system of FIG. 1 in accordance with at least some embodiments.
Figure 5A:
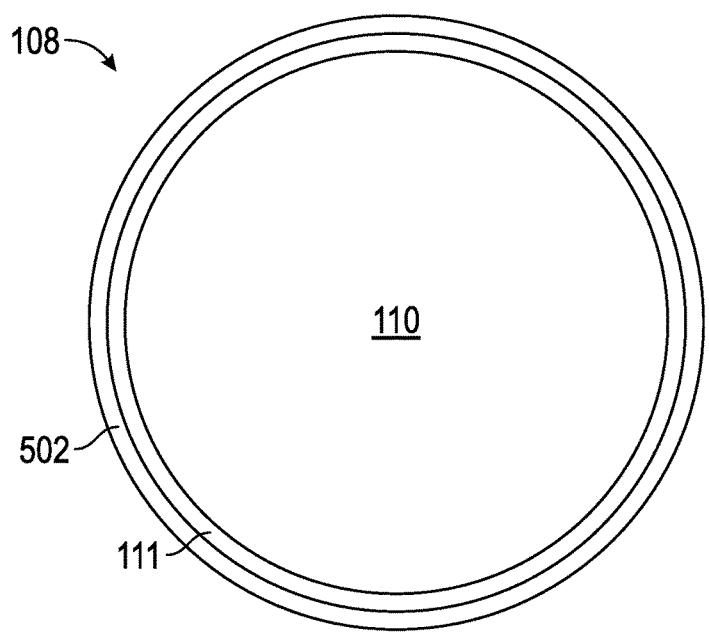

Referring to FIGS. 5 and 5A, in an alternative embodiment, the barrier 108 may also comprise an edge 502 disposed about the periphery of seal fixture 111 and configured to scrape and remove any semi-solid or solid waste residue that has accumulated on the dirty side 112 of the interior volume 106 when the barrier 108 is pushed to offload waste. In this way, edge 502 may aid the seals 116 in wiping the interior surface 105 of shell 104. Edge 502 may be formed from a semi-rigid plastic such as acrylonitrile butadiene styrene (ABS), or alternatively a metal such as stainless steel or brass. In at least some embodiments, edge 502 may be formed from the same material as seal fixture 111. In FIG. 5A. In FIGS. 5 and 5a, any stiffeners which may be used in at least some embodiments have been omitted from disk 110 for ease of illustration.

Figure 6:
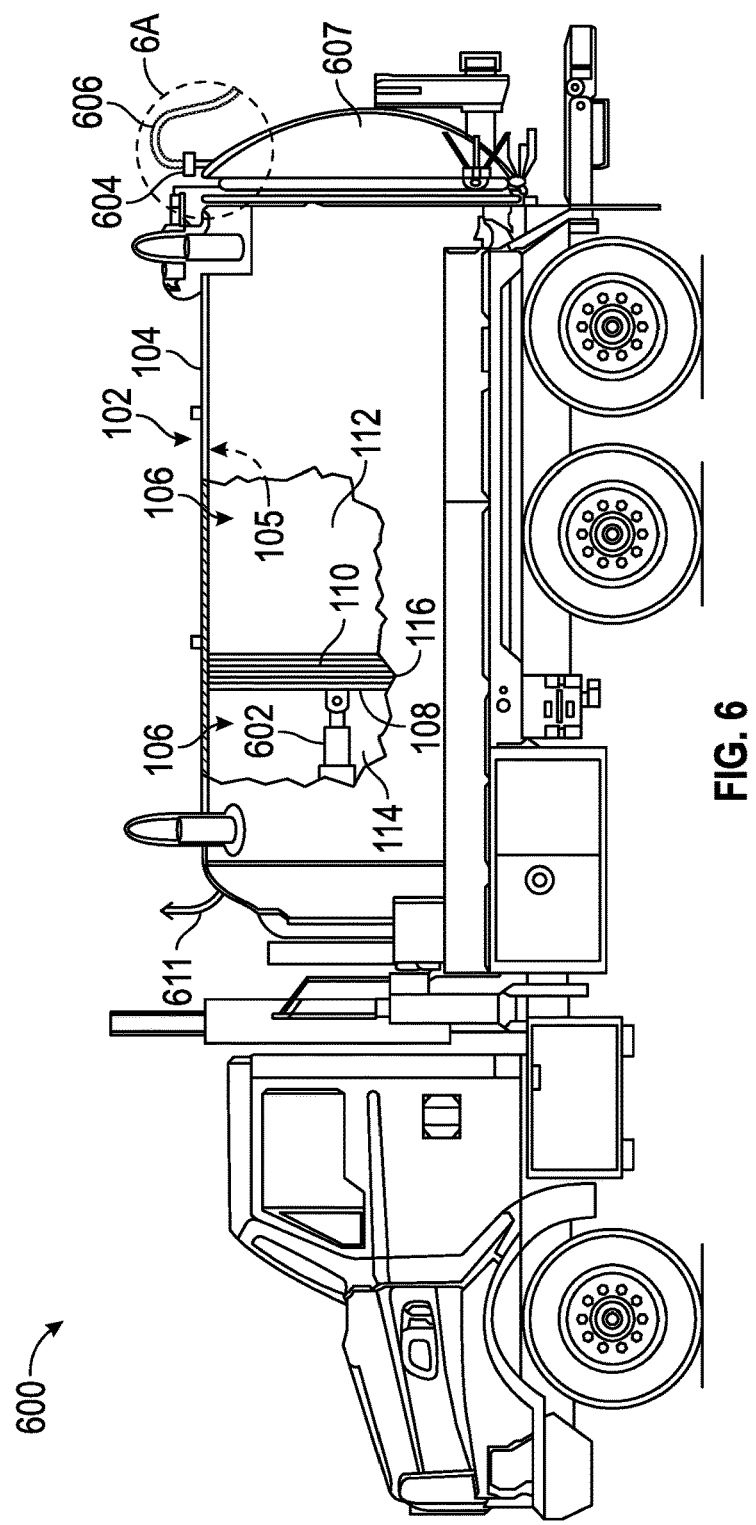
FIG. 6 shows a partial cutaway view of a system according to an embodiment of the disclosure.

Turning now to FIG. 6, a liquid vacuum truck system 600 in accordance with an alternative embodiment of the present disclosure is shown. Liquid vacuum truck system 600 is similar to the system shown in FIG. 1. Liquid vacuum truck system 600 includes a hydraulic cylinder 602 and a waste container 102 which can be comprised of any material that is structurally sound, including stainless steel and other metals. The shell 104 and waste container 102 may be one and the same and made of the same material. Alternatively, the shell 104 may be a liner made of a material that exhibits a smooth surface. The internal volume 106 of waste container 102 is bisected by a barrier 108, thereby creating two chambers, a clean side 114 and a dirty side 112. Hydraulic cylinder 602 is attached to barrier 108 and operates the barrier 108 back and forth across the internal volume 106. Barrier 108 can be comprised of a disk 110 made of the same material as shell 104. Alternatively, disk 110 can be comprised of material compatible with the material of shell 104. As described above, disk 110 may include one more stiffeners attached thereto (not shown in FIG. 6) to mitigate against deflection of the disk 110 when motivated by hydraulic cylinder 602. Barrier 108 further comprises one or more seals 116 which encircle the outer rim of disk 110, as previously described, and provide a sealing contact with interior surface 105 of shell 104.

Liquid vacuum truck system 600 operates in the following manner. The hydraulic cylinder 602 of liquid vacuum truck system 600 motivates the barrier 108 such that the volume of dirty side 112 increases and the volume of clean side 114 decreases. The movement of hydraulic cylinder 602 creates a vacuum in dirty side 112 that permits liquid or semi-liquid waste to be aspirated or vacuumed into the dirty side 112 of waste container 102. Barrier 108 prevents leakage of waste material from dirty side 112 to clean side 114. As more waste is aspirated into dirty side 112 and as barrier 108 moves across the internal volume 106, the volume of dirty side 112 increases and the volume of clean side 114 decreases. Once the dirty side 112 reaches its maximum volume, the liquid or semi-liquid waste can be transported and disposed of. The movement of the barrier 108 can be reversed by extending the hydraulic cylinder to offload the liquid or semi-liquid waste as necessary.

Figure 6A:
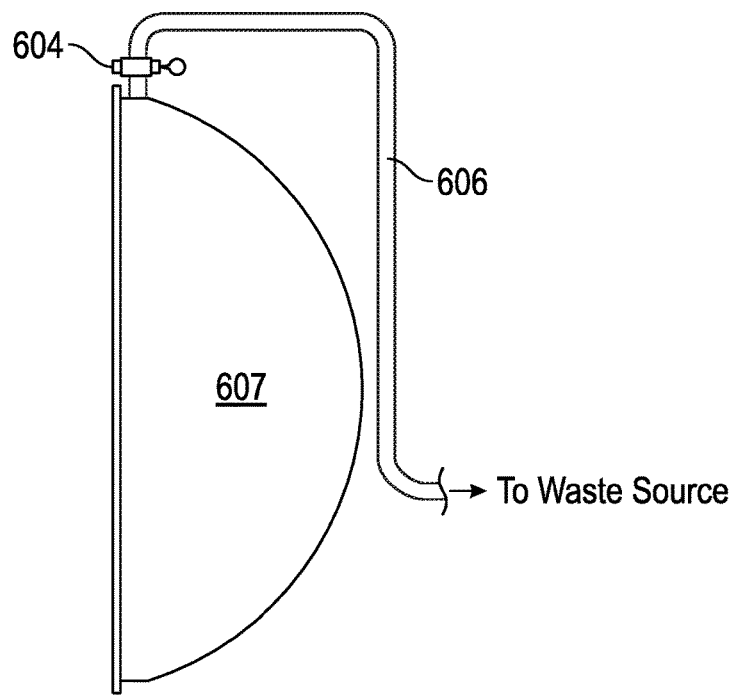
FIG. 6A shows a portion of the system of FIG. 6 in further detail.

In another alternative embodiment, the liquid vacuum truck system 100 and the liquid vacuum truck system 600 may additionally comprise an air operated valve 604 (not shown in FIG. 1) which may be located at zero degrees, or in other words 12 o'clock in orientation to waste container 102 when viewed from the rear. The air operated valve 604 located near the top and rear of the waste container 102 permits air to be released from the dirty side 112 in order to maximize the volume of liquid waste collected during the operation of the liquid vacuum truck system if unwanted air is collected on the dirty side 112 during vacuuming operations. For example, the liquid vacuum truck system may be operating to vacuum liquid but may also take in a large quantity of air into dirty side 112 depending on the efficiency of the vacuuming operation. When the barrier 108 reaches one end of the internal volume 106 and reaches its maximum capacity whereby it cannot intake any further waste, the volume of dirty side 112 may be comprised partly of air and partly of liquid or semi-liquid waste. The air operated valve 604 can then be opened to expel air from dirty side 112 by way of movement of barrier 108 in condensing the volume of dirty side 112 until all of the air is removed. In the exemplary embodiment of liquid vacuum truck 600, air operated valve 604 is disposed at the top of hatch 607. The example disposition of air operated valve 604 is shown in further detail in FIG. 6A. The expelled air should be routed with hoses, e.g. hose 606 back to the original source of the waste (not shown in FIGS. 6, 6A) or vented through a means of pollution control, such as a scrubber (not shown in FIGS. 6, 6A) if required by any applicable regulations. The liquid vacuum truck system can then resume operation and vacuum additional liquid or semi-liquid waste. In at least some embodiments, air operated valve 604 may be a commercially available device, such as a NAF-Torex butterfly valve from Flowserve Corp., Irving, Tex.

Figure 7:
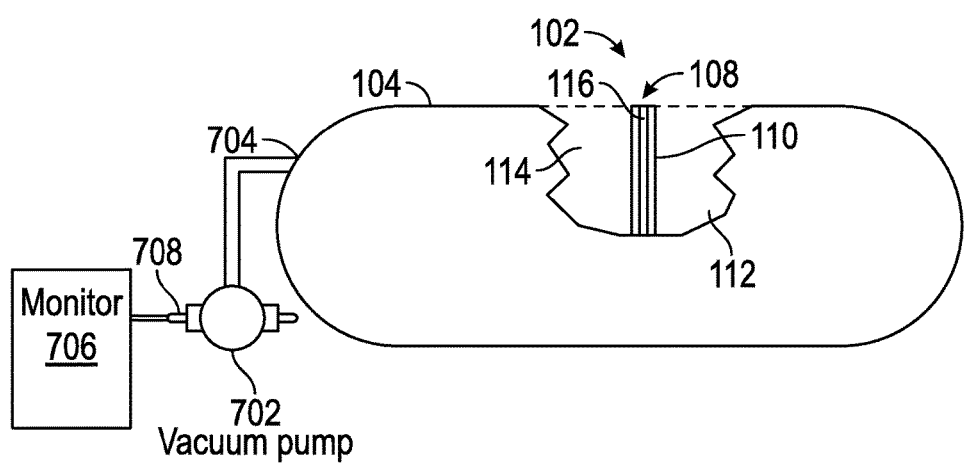
FIG. 7 shows a portion of a system according to an embodiment of the disclosure.

Turning now to FIG. 7, further aspects of an embodiment of a system 100 are shown. FIG. 7 illustrates a waste container 102 as previously described in conjunction with FIG. 1. As described in conjunction with FIG. 1, a vacuum drawn on clean side 114 motivates barrier 108 to increase the volume of the dirty side, aspirating waste into the dirty side 112. The vacuum may be provided by a vacuum pump 702 fluidly coupled to a port 704 disposed within shell 104 and fluidly coupled to clean side 114. Also as described above, barrier 108 comprises a disk 110, seal fixture 111 and seals 116 which form a gasket against the transport of volatile compounds from the dirty side 112 to clean side 114. The detection of any leakage of volatile compounds into the clean side 114 may be facilitated by coupling a monitor 706 to an exhaust port 708 of vacuum pump 702. An example of a commercially available monitor that may be used in at least some embodiments is an AreaRAE Steel multi-gas monitor from Rae Systems, Inc., San Jose, Calif. However, any monitor suitable for the environmental monitoring of volatile compounds, and particularly VOCs, may be used. Further, as would be appreciated by those skilled in the art having the benefit of the disclosure, a gas monitor may be attached to the vent 611 or a port providing access to the clean side 114 in a liquid vacuum truck system 600, FIG. 6 to monitor for leakage past the seals 116.

Figure 8:
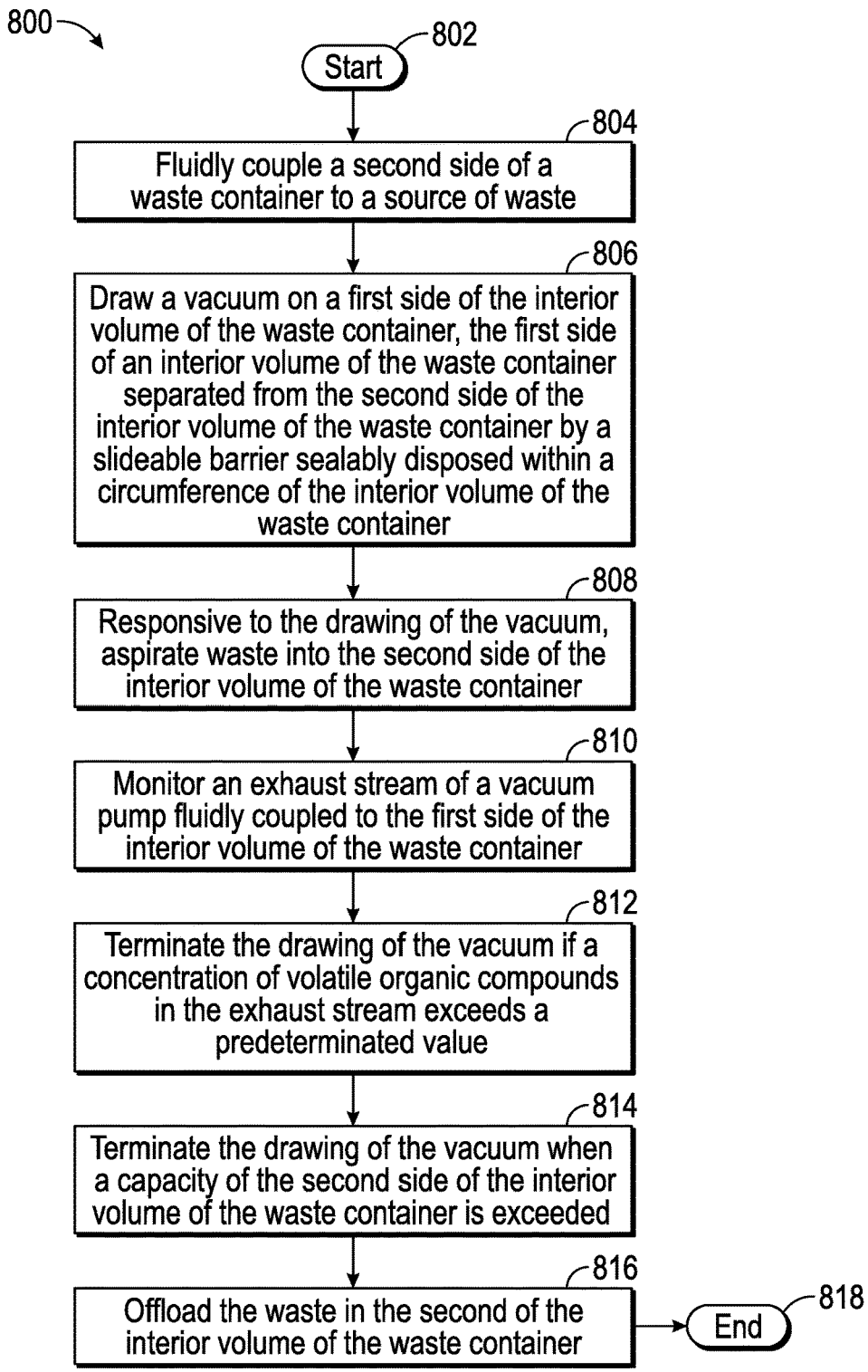
FIG. 8 shows a flowchart of a method in accordance with at least some embodiments of the disclosure.

FIG. 8 shows a flow chart of a method 800 in accordance with at least some embodiments. Method 800 starts at block 802. In block 804, a dirty side of an interior volume of a waste container is fluidly coupled to a source of waste. In block 806, a vacuum is drawn on a clean side of the interior volume of the waste container, the clean side of the interior volume of the waste container separated from the dirty side of the interior volume of the waste container by a slideable, barrier sealably disposed within a circumference of the interior volume of the waste container. For example, a vacuum having a negative gauge pressure of up to about −15 psig may be used. In block 808, responsive to the drawing of the vacuum on the clean side of the interior volume, waste is aspirated into the dirty side of the interior volume. Further, as described above, the barrier may be stiffened to mitigate against deflections of the barrier. As would be appreciated by persons skilled in the art having the benefit of the disclosure, the barrier sealably disposed within the circumference of the interior volume could leak due to wear or damage, for example. An exhaust stream from a vacuum pump coupled to a port in the clean side of the waste container for drawing the vacuum on the clean side may be monitored for volatile compounds, block 810. The drawing of the vacuum may be terminated if a concentration of volatile organic compounds in the exhaust stream exceeds a predetermined value, at block 812. For example, the predetermined value may be 100 parts per million (ppm) in at least some embodiments. As described above, the vacuum induces the displacement of the barrier such that waste is aspirated into the dirty side of the waste container. In block 814, the drawing of a vacuum on the clean side is terminated when a capacity of the dirty side of the waste container is reached. The waste in the dirty side of the waste container is offloaded, block 816. The waste may be offloaded by displacing the barrier towards the dirty side of the interior volume of the waste container. The barrier may be displaced toward the dirty side of the interior volume by applying a positive pressure to the clean side of the waste container. The positive pressure may be applied by reversing the vacuum pump used to draw the vacuum. A positive pressure up to about 35 psig may be used, for example. Method 800 ends at block 818.

The above discussion is meant to be illustrative of the principles and various embodiments of the present invention. Numerous variations and modifications will become apparent to those skilled in the art once the above disclosure is fully appreciated. For example, a non-contact liquid level gauge system can be attached to the waste container shell to measure the level of liquid in the dirty side during operation. And various diameters of the interior of the shell can be used, subject to the constraints on the deflection of the barrier as described herein. It is intended that the following claims be interpreted to embrace all such variations and modifications.

What is claimed is:

1. A system comprising:
 a container comprising:
  a cylindrical shell;

wherein the cylindrical shell defines an internal volume of the container;
a barrier comprising:
a disk slideably disposed within the interior volume of the container, the disk dividing the interior volume of the container into a first portion and a second portion;
a seal disposed about the disk and in sealing contact with an interior surface of the cylindrical shell; and
wherein:
the first portion is configured to sustain an internal pressure in a predetermined range; and
the second portion is configured to receive a waste material; and
wherein, when the internal pressure is at a maximum value of the predetermined range, the disk has a deflection less than a predetermined deflection at which the sealing contact is compromised.

2. The system of claim 1 wherein the internal pressure predetermined range is in the range from about -15 pounds per square inch gauge (psig) to about 35 psig.

3. The system of claim 1 wherein the disk comprises a metal selected from the group consisting of: stainless steel; brass; nickel-chromium-molybdenum-iron alloy; and nickel-chromium-iron alloy.

4. The system of claim 1 wherein the disk has a thickness such that the deflection of the disk at the maximum value of the predetermined range is less than the predetermined deflection.

5. The system of claim 4 wherein the thickness is in the range from about 0.250 inches to 0.375 inches.

6. The system of claim 1 wherein the barrier further comprises:
a seal fixture fixedly disposed about the disk, wherein the seal is disposed about a circumference of the seal fixture; and
an edge disposed about the periphery of the seal fixture, the edge configured to scrape residue from the interior surface of the shell.

7. The system of claim 6 wherein the disk comprises one or more stiffeners attached to a first side of the disk.

8. The system of claim 7 wherein the disk further comprises one or more stiffeners attached to a second side of the disk opposite the first side.

9. The system of claim 8 wherein the plurality of stiffeners attached to the second side is rotationally offset about a central axis of the disk from the plurality of stiffeners attached to the first side.

10. A system comprising:
a container comprising:
a cylindrical shell, wherein the cylindrical shell defines an internal volume of the container;
a barrier comprising:
a disk slideably disposed within the interior volume of the container, the disk subdividing the interior volume of the container into a first portion and a second portion;
a plurality of stiffeners attached to the disk; and
a seal disposed about the disk and in sealing contact with an interior surface of the cylindrical shell;
a hydraulic cylinder coupled to the disk, the hydraulic cylinder configured to motivate the barrier within the interior volume; and
wherein the second portion is configured to receive a waste material.

11. The system of claim 10 further comprising a gas monitor coupled to the first portion of the interior volume.

* * * * *